United States Patent
Kato et al.

(10) Patent No.: US 7,825,953 B2
(45) Date of Patent: Nov. 2, 2010

(54) VEHICULAR IMAGE DISPLAY APPARATUS

(75) Inventors: Mikio Kato, Nishio (JP); Ichiro Yoshida, Takahama (JP)

(73) Assignee: DENSO CORPORATION, Kariya (JP)

( * ) Notice: Subject to any disclaimer, the term of this patent is extended or adjusted under 35 U.S.C. 154(b) by 1245 days.

(21) Appl. No.: 11/398,552

(22) Filed: Apr. 6, 2006

(65) Prior Publication Data

US 2006/0244829 A1    Nov. 2, 2006

(30) Foreign Application Priority Data

Apr. 28, 2005   (JP)   ............... 2005-132101

(51) Int. Cl.
*H04N 7/18* (2006.01)
*G09F 9/00* (2006.01)

(52) U.S. Cl. .................. 348/148; 348/143; 340/461

(58) Field of Classification Search ......... 348/143–148, 348/113–116, 837; 340/461
See application file for complete search history.

(56) References Cited

U.S. PATENT DOCUMENTS

| | | | | |
|---|---|---|---|---|
| 5,289,321 | A * | 2/1994 | Secor | 359/896 |
| 5,963,247 | A * | 10/1999 | Banitt | 348/121 |
| 6,498,620 | B2 * | 12/2002 | Schofield et al. | 348/148 |
| 6,593,960 | B1 * | 7/2003 | Sugimoto et al. | 348/148 |
| 6,683,539 | B2 * | 1/2004 | Trajkovic et al. | 340/932.2 |
| 6,812,831 | B2 | 11/2004 | Ikeda | |
| 7,518,809 | B2 * | 4/2009 | Yamakawa et al. | 359/753 |
| 7,561,181 | B2 * | 7/2009 | Schofield et al. | 348/148 |
| 2003/0078713 | A1 * | 4/2003 | Tanaka et al. | 701/41 |
| 2003/0108222 | A1 | 6/2003 | Sato et al. | |

FOREIGN PATENT DOCUMENTS

| | | |
|---|---|---|
| JP | A-H6-227318 | 8/1994 |
| JP | A-H11-129815 | 5/1999 |
| JP | A-2000-272417 | 10/2000 |
| JP | A-2001-114048 | 4/2001 |
| JP | A-2004-64131 | 2/2004 |

* cited by examiner

*Primary Examiner*—Tuan Ho
*Assistant Examiner*—Marly Camargo
(74) *Attorney, Agent, or Firm*—Posz Law Group, PLC

(57) ABSTRACT

A vehicle is provided with two circular fish-eye lens-type cameras and three displays of a rear-window display, rear-pillar display, and side-window display. The first camera takes an image from a first region rearward of the vehicle; the second camera takes an image from a second region left sideward of the vehicle. The first and second regions are partially overlapped. Ultrawide-angle image data of the taken images are converted to typical lens image data, a part of which is clipped to correspond to an integrated region. The integrated region including a part of the first and second regions is viewed by an artificial driver sightline, which is assumed to pass through entire frames of the three displays to reach the integrated region. The three displays then reproduce an image of the integrated region without overlap based on the clipped image data.

8 Claims, 3 Drawing Sheets though the entire frame of the display itself. As a result, the driver can intuitively notice the state of the outer region including the blind zone rearward or sideward of the vehicle based on the images taken by the cameras.

VEHICULAR IMAGE DISPLAY APPARATUS

CROSS REFERENCE TO RELATED APPLICATIONS

This application is based on and incorporates herein by reference Japanese Patent Application No. 2005-132101 filed on Apr. 28, 2005.

FIELD OF THE INVENTION

The present invention relates to a vehicular image display apparatus for displaying an image which a camera takes from a region surrounding a vehicle.

BACKGROUND OF THE INVENTION

A driver of a vehicle has a blind zone typically rearward or sideward, which may be shaded by a rear trunk (in a sedan-type vehicle), a hatchback door (in a hatchback-type vehicle), or a rear pillar. For instance, a vehicle with right-hand drive typically has a relatively large blind zone left rearward of the vehicle. To deal with the problem, in Patent Documents 1, 2, a camera is provided to take an image from the blind zone; then, the taken image is displayed (or reproduced) in a monitor placed frontward or rearward of a driver's seat.

In this case, a taken image from an actual given region is displayed in a monitor placed in a position or direction different from that of the actual given region. If an obstacle displayed in the monitor, it is difficult for a driver to intuitively notice a positional relationship between an actual position or direction of the obstacle and the vehicle, deteriorating user-friendliness.

Patent Document 1: JP-H6-227318A
Patent Document 2: JP-H11-129815A

SUMMARY OF THE INVENTION

It is an object of the present invention to provide a vehicular image display apparatus allowing an image, which a camera takes from a region rearward or sideward of a vehicle, to be noticed intuitively without feeling strangeness.

To achieve the above object, an image display apparatus for a vehicle is provided with the following. A seat of a driver of the vehicle is adjacent to a first side, which is one of a right side and a left side of the vehicle. A first camera is included for producing first image data corresponding to a first outer region rearward of the vehicle. A second camera is included for producing second image data corresponding to a second outer region outward of a second side opposite to the first side of the vehicle, the second outer region having an overlap with the first outer region. A display arranged inside the vehicle is included for displaying an image of a part of the first outer region and the second outer region. An image processing unit is included for processing the first image data and the second image data to produce processed image data corresponding to an integrated region, which includes a part of the first outer region and the second outer region without the overlap and is viewed by an artificial sightline of the driver, which is assumed to pass through the display to reach the integrated region so that the integrated region is visible for the driver. A display control unit for causing the display to reproduce an image of the integrate region using the processed image data.

Under the above structure, an image of an actual state including a blind zone in an outer region rearward or sideward of the vehicle can be reproduced to be visible for the driver on the display as if the driver can see the outer region including the blind zone through the entire frame of the display itself. As a result, the driver can intuitively notice the state of the outer region including the blind zone rearward or sideward of the vehicle based on the images taken by the cameras.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 3:
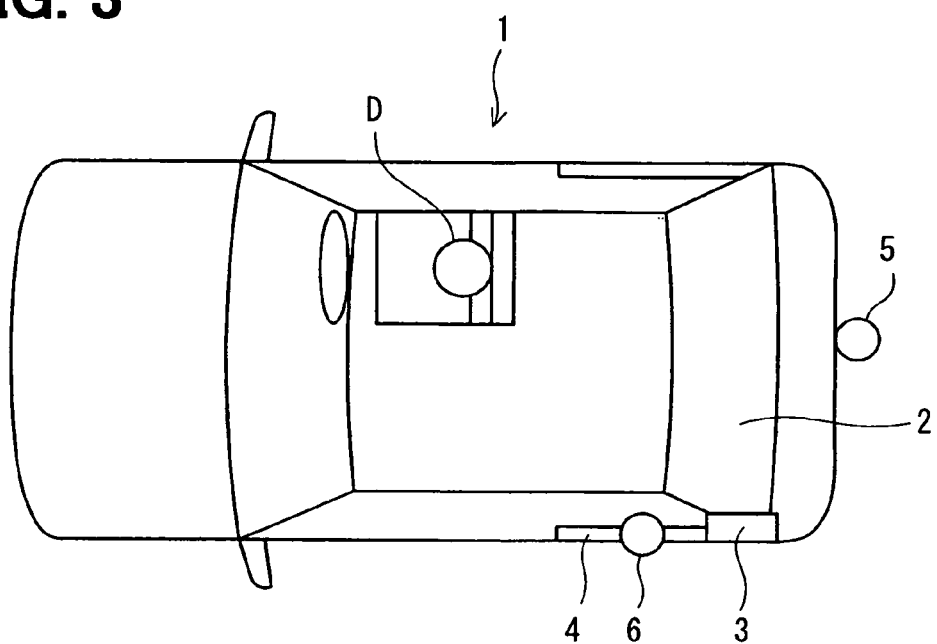
FIG. 3 is a plan view of a vehicle.

A vehicle 1 with right-hand drive is a hatchback-type vehicle, as shown in FIG. 3. A seat of a driver D of the vehicle 1 is adjacent to a right side (right side wall) (relative to an advancing direction of the vehicle) of the vehicle. A rear-window display 2 of, e.g., a transparent-type EL (Electroluminescence) panel as a first sub-display is placed in a rear window as a part of a rear (rear wall) of the vehicle 1. A rear-pillar display 3 of, e.g., an EL panel is placed inside of a left rear pillar as a part of a left side (left side wall) of the vehicle 1. A side-window display 4 of, e.g., a transparent-type EL panel is placed in a rear side window as a part of the left side of the vehicle 1. A pair of the rear-pillar display 3 and the side-window display 4 is referred to as a second sub-display.

A first camera 5 is placed at an outer rear portion of the vehicle 1. The first camera 5 has a circular fish-eye lens of a 180-degree ultrawide-angle to take an image from a region rearward of the vehicle 1 (or to produce image data corresponding to a region reward of the vehicle 1). A second camera 6 is placed at an outer side portion of the vehicle 1. The second camera 6 also has a circular fish-eye lens of a 180-degree ultrawide-angle to take an image from a region left sideward of the vehicle 1. Each camera 5, 6 is able to photograph a night vision (or to produce, from a dark region, image data that is to realize a visible image). This is achieved by switching between a CCD (or CMOS) camera and an infrared camera, or by using a highly sensitive camera.

Figure 1:
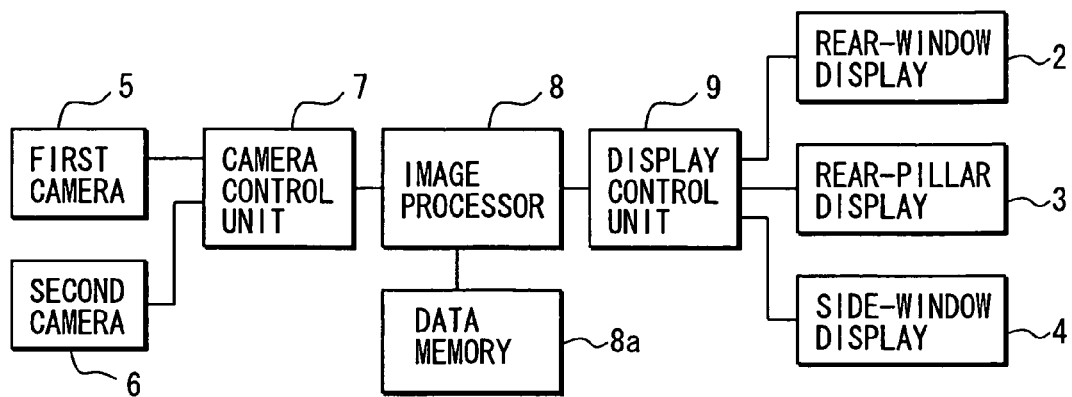
FIG. 1 is a block diagram illustrating a schematic overall structure of a vehicular image display apparatus according to an embodiment of the present invention.

Next, with reference to FIG. 1, an overall structure of the image display apparatus will be explained below. A camera control unit 7 activates the first and second cameras 5, 6 when an operating switch (not shown) is turned on for checking a state rearward or sideward of the vehicle 1, when a spoken operation instruction is outputted via a voice input unit, or when a shift lever of the vehicle 1 is shifted to a reverse position. The camera control unit 7 retrieves an image taken by the camera 5, 6 at given time intervals and sends data of the image (ultrawide-angle lens image data) to an image processor 8. The camera control unit 7 sets the first and second cameras 5, 6 to a night vision mode at night. Whether it is at night is determined by whether an illumination sensor mounted in the vehicle 1 detects that an illumination intensity of vicinity of the vehicle 1 is less than a given value or by whether a lighting switch is tuned on. The image data sent to the image processor 8 is, e.g., time-lapse moving image data.

The image processor 8 as an image processing unit has a function to process the image data received from the camera control unit 7 so that the image data can be displayed as video on the rear-window display 2, rear-pillar display 3, and side-window display 4, which will be explained later.

A display control unit 9 reproduces the processed image data on the displays 2 to 4, and includes a data memory 8a as a storage unit such as a video RAM to temporarily store the above image data. The display control unit 9 can additionally include an illumination adjustment function to adjust a luminance of the displays 2 to 4.

The image processor 8 is accessibly connected with the data memory 8a of a non-volatile memory as a storage unit such as a ROM or flush memory to previously store attribute data for a plug and play function relating to the displays 2 to 4 as follows:

(i) ID numbers uniquely assigned to each display 2, 3, 4

(ii) the number of pixels of each display 2, 3, 4

(iii) three-dimensional relative position coordinate data specifying an outer shape of each display 2, 3, 4

(iv) three-dimensional absolute position coordinate data specifying an actual setting position of each display 2, 3, 4

Figure 2:
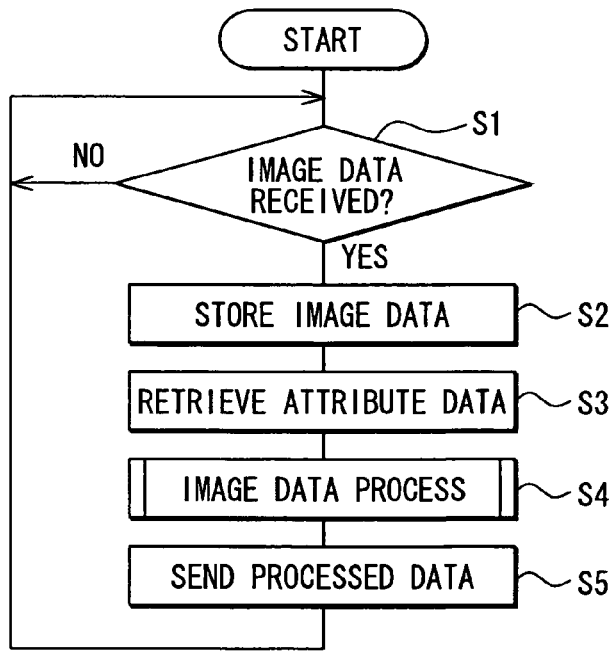
FIG. 2 is a flowchart diagram illustrating an imaging process by an image processor.

Next, a control example of the image processor 8 will be explained with reference to FIG. 2. The image processor 8 waits until new image data is received from the camera control unit 7 (Step S1). The received image data is stored in an internal storage unit such as a RAM (not shown) (Step S2). The attribute data relating to the displays 2 to 4 is retrieved (Step S3) to then start an image data process routine (S4).

The image processor 8 includes functions as programs as follows:

(i) an image converting function to convert ultrawide-angle image data, which is received from the camera control unit 7, to typical-lens image data;

(ii) a first extracting function to extract, from image data taken by the first camera 5, first image data corresponding to a first outer region viewed by an artificial (or virtual) driver sightline, which is assumed to pass through the entire physical frame of the rear-window display 2 itself to reach the first outer region; and (iii) a second extracting function to extract, from image data taken by the second camera 6, second image data corresponding to a second outer region viewed by an artificial driver sightline, which is assumed to pass through the entire physical frame of the pair of the rear-pillar display 3 and side-window display 4 themselves to reach the second outer region.

At the image data process routine S4, image data is processed using the above three functions included in the image processor 8.

Figure 4:
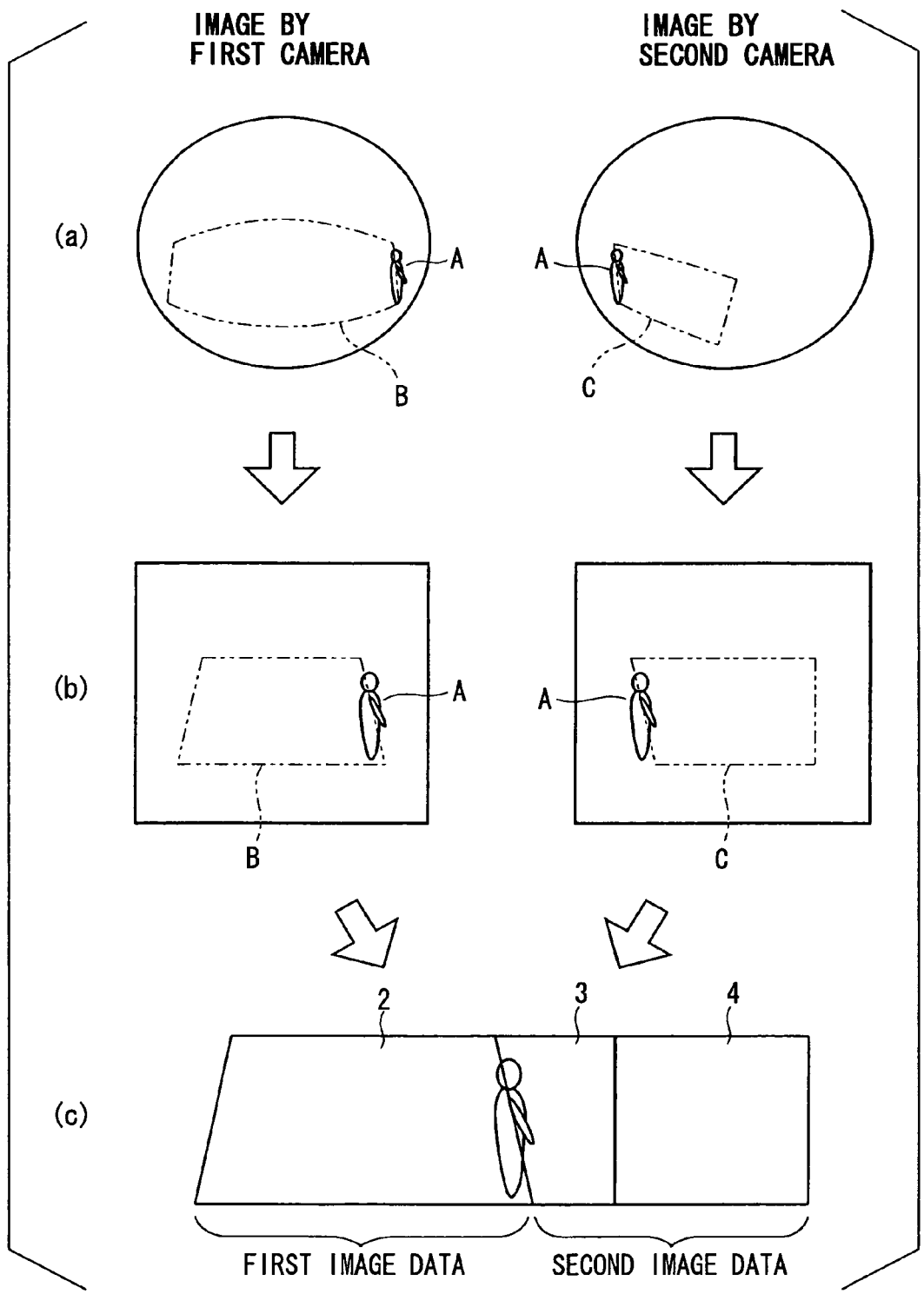
FIG. 4 is a schematic view illustrating integrating steps of an imaging process by the image processor.

For instance, each ultrawide-angle image data taken by each camera 5, 6 is schematically illustrated in (a) in FIG. 4. A pedestrian as an obstacle is shown in a figure A in FIG. 4. An outline of the entire physical frame of the rear-window display 2 is shown as a chain double-dashed line B, while an outline of the entire physical frame of the rear-pillar display 3 and side-window display 4 is shown in as a chain double-dashed line C. Namely, first image data surrounded by the outline B corresponds to a first outer region viewed by a driver sightline, which is assumed to pass through the entire physical frame of the rear-window display 2 itself; second image data surrounded by the outline C corresponds to a second outer region viewed by a driver sightline, which is assumed to pass through the entire physical frame of the rear-pillar display 3 and side-window display 4 themselves.

In the image data process routine S4, each ultrawide-angle image data in (a) in FIG. 4 is converted to typical-lens image data shown in (b) in FIG. 4 using the image converting function. The "typical lens" means a lens having a typical focus distance or having a focus distance close to the typical focus distance: the typical focus distance is regarded as a standard in a typical camera system.

Then, the first image data surrounded by the line B and second image data surrounded by the line C are clipped from the typical-lens image data shown in (b) in FIG. 4. Thus, an overlap between the first image data and the second image data can be removed to produce processed image data corresponding to an integrated region (viewed and regarded as a single region without gap) of the first outer region and second outer region. Then, Step S5 is performed.

At Step S5, the first image data and second image data, which are processed at S4, are sent to the display control unit 9; then, Step S1 of an initial state is repeated.

The display control unit 9 performs a control to enable the rear-window display 2 to display the first image data and the rear-pillar display 3 and side-window display 4 to display the second image data.

Next, schematic integrating steps of an imaging process by the image processor 8 will be explained with reference to a plan view in FIG. 5. An image X is formed by typical-lens image data corresponding to image data taken by the first camera 5, while an image Y by the second camera 6.

The first extracting function clips image data corresponding to a region Xa viewed by a sightline of the driver D, which is assumed to pass through (the entire physical frame of) the rear-window display 2, while the second extracting function clips image data corresponding to a region Ya viewed by a sightline of the driver D, which is assumed to pass through the entire physical frame of the rear-pillar display 3 and side-window display 4.

Figure 5:
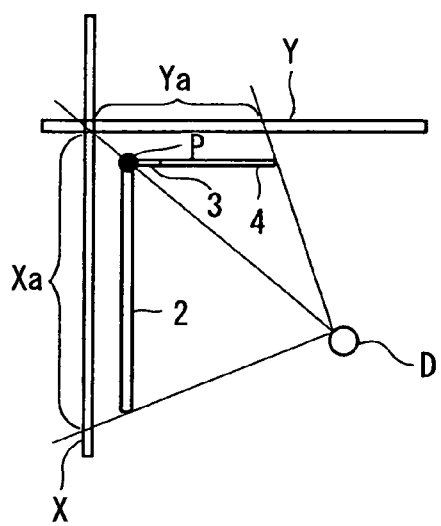
FIG. 5 is a schematic view illustrating an imaging process by the image processor.

Accordingly, as shown in (c) in FIG. 4 and FIG. 5, a connection part P, which is formed between an image on the rear-window display 2 using the first image data and an image on the rear-pillar display 3 and side-window display 4 using the second image data, is automatically determined in a proper position that helps prevent feeling of strangeness.

Under the above example structure of this embodiment, the following effect can be expected. Namely, the rear-window display 2, rear-pillar display 3, and side-window display 4 can display an image illustrating an actual state of an outer region rearward and sideward of the vehicle 1 taken by the first and second cameras 5, 6. The displayed image is similar to that viewed by a sightline of the driver D, which is assumed to pass through the entire physical frames of the displays 2 to 4. As a result, the driver can intuitively notice a blind zone (dead spot) of an outer region rearward and sideward of the vehicle 1 based on the image taken by the first and second cameras 5, 6 while helping prevent the driver from feeling strange.

Furthermore, each of the first and second cameras 5, 6 uses a fish-eye lens having an extremely deep depth of vision field, so that image data having a high image quality can be obtained without focusing.

The attribute data for plug and play functions relating to the displays 2 to 4 is previously stored in the data memory 8a. The attribute data includes the ID numbers, the numbers of pixels, three-dimensional relative position coordinate data specifying outer shapes (or dimensions), and three-dimensional absolute position coordinate data specifying the actual setting positions. The image processor 8 determines a clipped region of the image data taken by the first and second cameras 5, 6 with reference to the attribute data stored in the data memory 8a. Therefore, when a type of a vehicle where the image display apparatus of this embodiment is mounted is differentiated, or when the outer shapes or setting positions of the displays 2 to 4 are differentiated, the above-described imaging process can be performed only by changing the data stored in the data memory 8a. This allows the image display apparatus of this embodiment to have a wide range of versatility.

At night, e.g., when an illumination intensity of vicinity of the vehicle 1 is less than a given value, the cameras 5, 6 are switched to a night vision mode to allow an outer region rearward and sideward of the vehicle 1 to be photographed as a visible image. Even when the vicinity is dark, e.g., at night, a clear image can be reproduced on the displays 2 to 4, allowing the driver to notice the state of the outer region rearward and sideward of the vehicle 1.

The rear-window display 2 and side-window display 4 placed in the rear window and side window, respectively, are formed a transparent-type EL panel of a transparent-type element. Therefore, the presence of the displays 2, 4 does not prevent a view through the displays 2, 4.

When a vicinity of the vehicle 1 is dark, an outer region is naturally invisible through the rear-window display 2 (or rear window) and the side-window display 4 (or side window). Since the first and second cameras 5, 6 function in the night vision mode in this embodiment, an image based on the image data taken in the night vision mode can be reproduced as a visible image on the displays 2 to 4. This allows the driver to intuitively notice the state of the outer region rearward and sideward of the vehicle 1 at night.

(Others)

In the above embodiment, image data taken by the first camera 5 is used for clipping image data corresponding to the rear-window display 2; however, it can be used for further clipping image data corresponding to another region, e.g., a part of the rear-pillar display 3 and side-window display 4.

Figure 6:
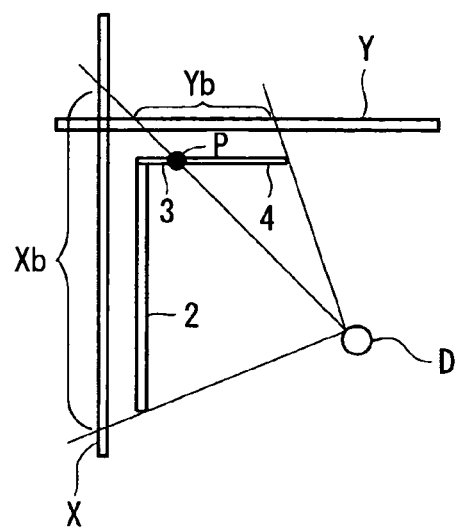
FIG. 6 is a schematic view illustrating another imaging process by the image processor.

This will be explained with reference to FIG. 6. The first camera 5 produces image data corresponding to an image X; the second camera 6 produces image data corresponding to an image Y. In the first extracting function of the image processor 8, image data corresponding to a region Xb (as a part of the image X) is clipped that is viewed by a sightline of the driver D assumed to transmit a part of the rear-pillar display 3 in addition to the rear-window display 2. In the second extracting function, image data corresponding to a region Yb (as a part of the image Y) is clipped that is viewed by a sightline of the driver D, which is assumed to pass through a part of the rear-pillar display 3, which remains without being clipped after the first extracting function, and the side-window display 4. In this case, as shown in FIG. 6, a connection part P, which is formed between an image formed using the first image data and an image formed using the second image data, is moved towards a front of the vehicle 1.

In contrast, alternatively, the image data taken by the second camera 6 can be used for clipping image data corresponding to a part of the rear-window display 2 in addition to the rear-pillar display 3 and side-window display 4.

In the above embodiment, in the image data process routine S4, ultrawide-angle image data taken by the first and second cameras 5, 6 is at first converted to typical-lens image data by the image converting function; then, necessary image data is clipped by the first and second extracting functions. However, in contrast, an order of executing the functions can be changed; namely, after necessary ultrawide-angle image data taken by the first and second cameras 5, 6 can be clipped at first by the first and second extracting functions in series, the clipped ultrawide-angle image data can be then converted to typical-lens image data.

Furthermore, when an outer region is directly visible through the rear-window display 2 and side-window display 4 of the transparent-type element, only image data forming a blind zone for the driver D can be clipped from within the image data produced by the first and second cameras 5, 6. In this case, an outer region not being a blind zone can be directly visible through the transparent-type element of the rear-window display 2 and side-window display 4, so that unnecessary image is not necessarily displayed on the displays 2, 4.

Furthermore, for instance, the rear-window display 2 can be extended outward of a peripheral outline of the rear window by adding a display portion around the rear window itself. In this case, with respect to an outer region rearward of the vehicle 1, a part not a blind zone is directly viewed through the rear window, while a part of a blind zone is viewed on the additionally extended display part of the rear-window display 2.

Furthermore, in the first and second extracting functions, a clipped part of the image data produced by the cameras 5, 6 can be designed to be changed depending on a sightline of a driver by providing a calibrating (or adjusting) function. Namely, the calibration function can adjust a clipped part following a sightline of each of several drivers so that the displays 2 to 4 can properly reproduce an image to be properly viewed by individual drivers. Thus, according to an embodiment of the image display apparatus, the image processing unit includes an adjusting function for adjusting a region of a clipped part of the first image data and the second image data based on information relating to a start point of a sightline of a driver.

Furthermore, another second camera can be also placed outwardly on the right side of the vehicle, and another side-window display can be placed in the right-side window.

Furthermore, the cameras 5, 6 can use an ultrawide-angle lens having an angle smaller than that of a fish-eye lens.

Furthermore, a vehicle where the image display apparatus is provided can be not only a passenger car such as a hatch-back-type or sedan-type, but also a vehicle such as a truck where it is difficult for a driver to notice an outer region rearward or sideward of the vehicle.

Furthermore, in the above embodiment, the rear-window display, the rear-pillar display, and the side-window display are explained as a display or a screen. However, without limited to the above embodiment, the display or the screen can be differently provided.

For instance, the display can be divided into not only three but also more than three. For instance, a display can include several sub-displays arranged inside the vehicle. The sub-displays are adjacent to each other. In this case, the processed image data can be divided into corresponding data items. The integrated region can be divided into corresponding sub-regions. The image processor clips the first image data and the second image data to produce each data item corresponding to each sub-region. Each sub-region is viewed by the artificial sightline of the driver, which is assumed to pass through each sub-display to reach each sub-region. Each sub-display can therefore reproduce an image of each sub-region using each data item.

For instance, if there is a wall or door on the side of the vehicle, a display formed of a liquid crystal display or an EL display can be embedded in the wall or door. This display can be also movable in its position to be adjacent to the side window with no apparent gap visible.

Furthermore, a structure of a display can be not only a hard type but also a film or paper type.

For instance, a display such as an EL display can be attached to or embedded into a pillar.

For instance, if no passenger is seated on a rear seat, a screen can be hanged from a ceiling of the passenger compartment. Further, a mono-colored seat cover can be a screen. If a passenger is seated on a rear seat, a screen can be hanged in front of the passenger from a ceiling of the passenger compartment. Furthermore, an organic EL display formed on a resin film can be adopted which can be rolled or expanded as needed. In those cases, it is preferable that an image can be displayed without gap or overlap between the display (or screen) and a side-window display. When a screen is used, an additional projector is required.

For instance, if no rear window is provided in a rear portion of a passenger compartment of a truck, a display of any type can be placed on the rear portion.

Individual processing or execution explained in the above embodiment, e.g., using the flowchart can be constructed as a unit or means in a program stored in the ROM or the like and executed by using a CPU or the like.

It will be obvious to those skilled in the art that various changes may be made in the above-described embodiments of the present invention. However, the scope of the present invention should be determined by the following claims.

What is claimed is:

1. An image display apparatus for a vehicle, a seat of a driver of which is adjacent to a first side, which is one of a right side and a left side of the vehicle, the apparatus comprising:
    a first camera for producing first image data corresponding to a first outer region rearward of the vehicle;
    a second camera for producing second image data corresponding to a second outer region outward of a second side opposite to the first side of the vehicle, the second outer region having an overlap with the first outer region;
    a display arranged inside the vehicle for displaying an image of a part of the first outer region and the second outer region;
    an image processing unit for processing the first image data and the second image data to produce processed image data corresponding to an integrated region, which includes a part of the first outer region and the second outer region without the overlap and is viewed by an artificial sightline of the driver, which is assumed to pass through the display to reach the integrated region so that the integrated region is visible for the driver;
    a display control unit for causing the display to reproduce an image of the integrate region using the processed image data; and
    a storage unit for storing shape data specifying an outer shape of each sub-display, and position data specifying arranged positions of each sub-display, wherein
    the display includes a plurality of sub-displays arranged inside the vehicle, the sub-displays being adjacent to each other,
    the processed image data includes a plurality of data items,
    the integrated region includes a plurality of sub-regions,
    the image processing unit clips the first image data and the second image data to produce each data item corresponding to each sub-region, which is viewed by the artificial sightline of the driver, which is assumed to pass through each sub-display to reach the each sub-region,
    the display control unit causes the each sub-display to reproduce an image of the each sub-region using the each data item,
    the image processing unit clips the first image data and the second image data by referring to the shape data and the position data stored in the storage unit, and
    the display control unit causes the each sub-display to reproduce an image of the each sub-region using the each data item, the image being displayed without an overlap with an image reproduced in a sub-display adjacent to the each sub-display.

2. The image display apparatus of claim 1, wherein
    the display includes (i) a first sub-display arranged on a rear portion inside of the vehicle and (ii) a second sub-display arranged on the second side inside of the vehicle and adjacent to the first sub-display,
    the processed image data includes first data item and second data item,
    the integrated region includes a first sub-region and a second sub-region,
    the image processing unit clips the first image data and the second image data to produce
        (i) the first data item corresponding to the first sub-region, which is viewed by the artificial sightline of the driver, which is assumed to pass through the first sub-display to reach the first sub-region, and
        (ii) the second data item corresponding to the second sub-region, which is viewed by the artificial sightline of the driver, which is assumed to pass through the second sub-display to reach the second sub-region, and
    the display control unit causes the first sub-display and the second sub-display to reproduce an image of the first sub-region and the second sub-region using the first data item and the second data item, the image having no gap and no overlap.

3. The image display apparatus of claim 2, wherein
    when the first sub-display includes a rear-window display formed of a transparent-type element in a rear window of the vehicle, while the second sub-display includes a side-window display of a transparent-type element in a side window of the vehicle.

4. The image display apparatus of claim 3, wherein
    each of the first camera and the second camera is able to produce from a dark region image data realizing a visible image,
    the display control unit causes the rear-window display and the side-window display to reproduce only the image data produced from the dark region by the first camera and the second camera.

5. The image display apparatus of claim 1, wherein
    the image processing unit includes an adjusting function for
    adjusting a region of a clipped part of the first image data and the second image data based on information relating to a start point of a sightline of a driver.

6. The image display apparatus of claim 1, wherein
    the first camera produces the first image data of ultrawide-angle image data by using an ultrawide-angle lens,
    the second camera produces the second image data of ultrawide- angle image data by using a wide-angle lens,
    the first image data and the second image data are converted from the ultrawide-angle image data to typical-lens image data,
    the image processing unit processes the first image data and the second image data which have been converted to the typical-lens image data.

7. The image display apparatus of claim 1, wherein
each of the first camera and the second camera is able to produce from a dark region image data realizing a visible image,
the display control unit causes the display to reproduce the image data produced from the dark region by the first camera and second camera.

8. The image display apparatus of claim 1, wherein
a blind zone for the driver seated on the seat adjacent to the first side of the vehicle is included in the first outer region and the second outer region;
the display control unit causes the display to reproduce an image so that the blind zone is visible from the driver.

* * * * *